(12) United States Patent
Mach

(10) Patent No.: US 10,737,443 B2
(45) Date of Patent: Aug. 11, 2020

(54) DEVICE AND METHOD FOR INDUCTIVE SEALING OF A PLURALITY OF PLIES OF A LAMINATE

(71) Applicant: ELOPAK AS, Spikkestad (NO)

(72) Inventor: Martin Mach, Mesto Touskov (CZ)

(73) Assignee: ELOPAK AS, Spikkestad (NO)

( * ) Notice: Subject to any disclaimer, the term of this patent is extended or adjusted under 35 U.S.C. 154(b) by 283 days.

(21) Appl. No.: 15/756,284

(22) PCT Filed: Aug. 24, 2016

(86) PCT No.: PCT/EP2016/070018
§ 371 (c)(1),
(2) Date: Feb. 28, 2018

(87) PCT Pub. No.: WO2017/036891
PCT Pub. Date: Mar. 9, 2017

(65) Prior Publication Data
US 2018/0250888 A1    Sep. 6, 2018

(30) Foreign Application Priority Data
Aug. 31, 2015   (DE) .................. 10 2015 114 443

(51) Int. Cl.
*B29C 65/00* (2006.01)
*B29C 65/36* (2006.01)
(Continued)

(52) U.S. Cl.
CPC ...... *B29C 66/43122* (2013.01); *B29C 65/368* (2013.01); *B29C 65/3656* (2013.01);
(Continued)

(58) Field of Classification Search
CPC ............ B29C 65/3656; B29C 65/3668; B29C 66/8122; B29C 66/43122;
(Continued)

(56) References Cited

U.S. PATENT DOCUMENTS 4,704,509 A * 11/1987 Hilmersson ......... B29C 65/3668
219/633
6,301,859 B1 * 10/2001 Nakamura .............. B29C 65/18
53/373.7
(Continued)

FOREIGN PATENT DOCUMENTS

| | | | |
|---|---|---|---|
| CH | 676958 A5 | 1/1991 | |
| CH | 676958 A5 * | 3/1991 | ............. B29C 65/00 |

(Continued)

*Primary Examiner* — Andrew M Tecco
*Assistant Examiner* — Nicholas E Igbokwe
(74) *Attorney, Agent, or Firm* — Lucas & Mercanti, LLP

(57) ABSTRACT

A device for inductive sealing of a plurality of plies of a laminate which comprises a carrier layer made of electrically non-conductive material, a sealing layer made of thermoplastic material and a metal layer disposed between the sealing layer and the carrier layer, includes two compressible sealing jaws, each fitted with an inductor embedded in a block of the sealing jaw. The block of each sealing jaw consists of a metallic material. A concentrator of each sealing jaw is composed of a plurality of partial pieces, wherein each partial piece consists of a material suitable for magnetic field concentration and all the partial pieces are electrically insulated from one another and with respect to the metal block. The inductor is disposed in a groove in the concentrator.

16 Claims, 7 Drawing Sheets

(51) Int. Cl.
*B65B 51/22* (2006.01)
*B29K 105/20* (2006.01)
*B29L 31/00* (2006.01)
*B29K 705/02* (2006.01)

(52) U.S. Cl.
CPC ...... *B29C 65/3668* (2013.01); *B29C 66/0342* (2013.01); *B29C 66/1122* (2013.01); *B29C 66/72321* (2013.01); *B29C 66/72343* (2013.01); *B29C 66/73921* (2013.01); *B29C 66/8122* (2013.01); *B29C 66/81811* (2013.01); *B29C 66/81831* (2013.01); *B29C 66/81871* (2013.01); *B29C 66/81881* (2013.01); *B29C 66/8322* (2013.01); *B65B 51/227* (2013.01); *B29C 66/71* (2013.01); *B29C 66/72328* (2013.01); *B29C 66/8242* (2013.01); *B29C 66/849* (2013.01); *B29C 66/8432* (2013.01); *B29K 2105/203* (2013.01); *B29K 2705/02* (2013.01); *B29L 2031/7166* (2013.01)

(58) Field of Classification Search
CPC .......... B29C 66/72321; B29C 66/8322; B29C 66/8432; B29L 2031/7166; B65B 7/16; B65B 51/227

USPC ...... 53/477, 329.2, 565, 373.7, 374.8, 375.3
See application file for complete search history.

(56) References Cited

U.S. PATENT DOCUMENTS

| | | | |
|---|---|---|---|
| 6,877,295 | B1 | 4/2005 | Benedetti et al. |
| 7,059,100 | B2 | 6/2006 | Babini et al. |
| 7,834,298 | B2 * | 11/2010 | Metodiev ............... H05B 6/103 |
| | | | 219/633 |
| 2002/0117248 | A1 * | 8/2002 | Basque ............... B29C 65/7433 |
| | | | 156/64 |
| 2006/0124626 | A1 * | 6/2006 | Kupfer ............... B29C 65/3656 |
| | | | 219/243 |
| 2010/0180545 | A1 * | 7/2010 | Palmquist ........... B29C 65/3656 |
| | | | 53/285 |
| 2017/0182702 | A1 | 6/2017 | Mach et al. |

FOREIGN PATENT DOCUMENTS

| | | |
|---|---|---|
| DE | 69833480 T2 | 8/2006 |
| DE | 102014107157 A1 | 11/2015 |
| EP | 1270182 A1 | 1/2003 |
| JP | 2000168737 A | 6/2000 |
| WO | 2015036222 A1 | 3/2015 |

\* cited by examiner

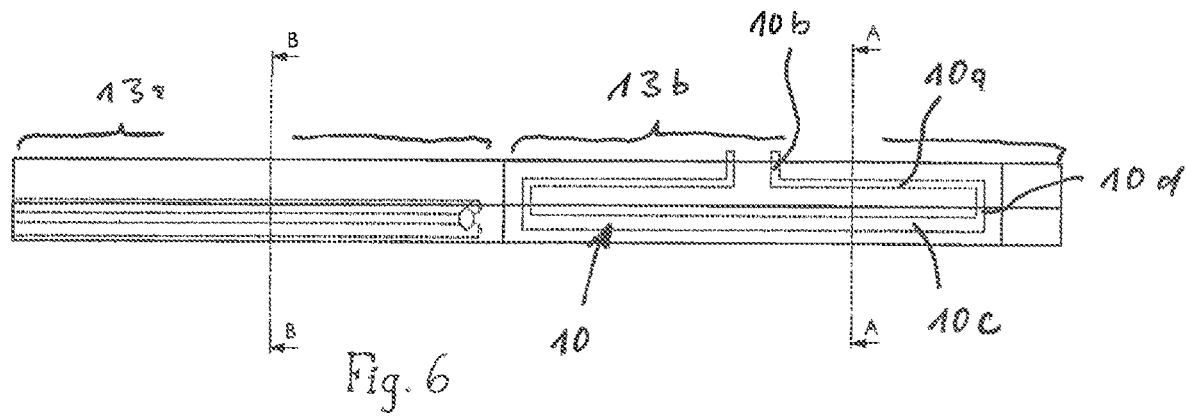
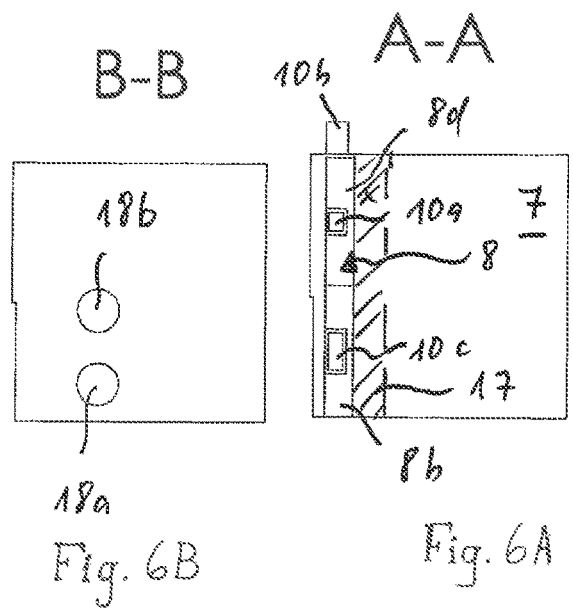

DEVICE AND METHOD FOR INDUCTIVE SEALING OF A PLURALITY OF PLIES OF A LAMINATE

CROSS-REFERENCE TO RELATED APPLICATIONS

This application is a 371 of PCT/EP2016/070018 filed Aug. 24, 2016, which in claims, the priority of DE 1.0 2015 114 443.3 filed Aug. 31, 2015, the priority of both applications is hereby claimed and both applications are incorporated herein by reference.

BACKGROUND OF THE INVENTION

The invention relates to a device and a method for the inductive sealing of a plurality of plies of a laminate.

Laminates are frequently used as packaging material for packagings of liquid foodstuffs which comprise a carrier layer made of electrically non-conductive material, in particular paper or card, and a sealing layer made of thermoplastic material, in particular thermoplastic plastic such as for example polyethylene or polypropylene. The thermoplastic material is liquid-tight and resistant to fatty substances and acids. A metal layer, in particular an aluminium layer, is disposed between the sealing layer and the carrier layer. The thermoplastic material is heat-sealable by pressing against one another mutually facing sealing layers of a plurality of laminate plies and welding together by application of heat. The heat is produced by inductive sealing by installing at least one coil (inductor) in the sealing jaws for pressing together the plies of the laminate, which coil induces eddy currents in the metal layer and heats this. As a result of heat conduction, this heat is transferred from the heated metal layer onto the adjacent layers of thermoplastic material which enter into the molten state under the action of heat.

A device for thermal sealing of packaging materials is already known from CH 676958 A5, which has a metal layer in addition to a thermoplastic layer. The device comprises two compressible sealing jaws, where both are fitted with an inductor which is used for heating the metal layer by means of induction in order to weld the thermoplastic layers of two adjacent plies of the packaging material when pressing together the sealing jaws. The inductor comprises at least one elongate current conductor extending in the longitudinal direction of the sealing jaws, which is either embedded directly in an electrically non-conductive block of the sealing jaw or in an intermediate piece made of ferrite, where this intermediate piece is mounted in a block made of an electrically non-conductive material.

Short heating times are required when sealing gable packages for liquid foodstuffs in a filling machine. This is because a long pressing and cooling phase is used because a high tension is present in the geometry of the gable, which gives the gable the tendency to re-open after the pressing time has ended. This tendency can be countered by a sufficiently long cooling of the molten thermoplastic material. The required short heating times are achieved by a high energy input into the inductor per unit time. As a result however, the losses are increased which can lead to an inadmissible heating of the inductor and optionally to local overheating of the laminate.

Although the inductor follows the geometry of the regions of the gable package to be sealed, in practice it has been found that in some cases a non-uniform heating of the sealing layer occurs with the consequence that the sealing of the gable package is not perfect.

Starting from this prior art, it is the object of the invention to provide a device for the inductive sealing of a plurality of plies of a laminate which, taking into account the required short heating times and the associated high energy input per unit time, avoids a non-uniform heating of the sealing layer of the laminate and therefore non-perfect seals.

In addition, a method for inductive sealing is to be provided which in particular is suitable for integration into a filling system for liquid foodstuffs with an aseptic working area.

BRIEF SUMMARY OF THE INVENTION

This object is solved in a device having two compressible sealing jaws, each fitted with an inductor with an elongate current conductor embedded in a block of the sealing jaw. The block consists of a metallic material. A concentrator composed of a plurality of partial pieces is fastened to the block, wherein each partial piece consists of a material suitable for magnetic field concentration and all the partial pieces are electrically insulated from one another and with respect to the block. The inductor is disposed in a groove in the concentrator.

The object is &so met by a method for inductive sealing, which is in particular suitable for integration in a filling plant for liquid foodstuffs with an aseptic working area wherein the method includes conveying the laminates into a sealing gap between first sections of the sealing jaws sealing the laminate in the sealing gap, and opening the first sealing gap, conveying the sealed piles to the sealing gap between second sections of the sealing jaws in an after-pressing and cooling region of the sealing gap, building a pressure into the sealed piles in the after-pressing and cooling region and cooling the laminate, and opening the sealing gap.

The block made of metal material contributes to the fact that the heat produced by the power loss in the inductor and the heat introduced into the sealing jaws through contact with the laminate to be welded can be removed more effectively. The block made of metal material prevents any impermissible heating of the inductor as a result of its high thermal conductivity.

In practice it was observed that under certain temperature and humidity conditions and in the case of concentrators having a high permeability, electrical flash-overs can occur between the lower and upper strand of the inductor. These flash-overs are responsible for the non-uniform heating of the sealing layer and non-perfect seals.

The non-uniform heating of the sealing layer is avoided whereby the concentrator consists of a plurality of partial pieces which are all electrically insulated from one another and with respect to the block. The electrical flash-overs between strands of the inductor are avoided by the division of the concentrator. Despite the high energy input required for the rapid heating, no parts of the inductor are temporarily ineffective.

In order to insulate the partial pieces from one another, in particular gaps are provided between the partial pieces of the concentrator. Preferably in order to further improve the electrical insulation, polyimide is introduced as insulating material into each gap, in particular in the form of a film. On account of its high heat resistance and the good electrical insulating properties, polyimide is particularly suitable for the present application.

Usually the inductor has an upper strand which runs horizontally in the installed position and a lower strand which runs horizontally in the installed position, wherein the upper and lower strand are connected to one another by means of lateral bends. The upper and lower strand is in each case let into at least one partial piece of the concentrator. The partial pieces are separated in the horizontal direction by a gap. The electrical connections of the inductor are preferably located in the upper strand. In this case, the upper strand is preferably let into at least two partial pieces of the concentrator, which are electrically insulated from one another by a perpendicularly running gap between the two connections. The surface of each inductor pointing in the direction of the sealing gap is preferably adapted to the geometry of the region of the sealing layer to be welded.

The partial pieces of the concentrator consist of a material which is suitable for magnetic field concentration. This comprises magneto-dielectric materials (MDM) which have both ferromagnetic and dielectric properties. The materials consist in particular of soft iron particles which are uniformly embedded in a thermoplastic material. The properties of the MDMs can be specifically influenced by the fraction, the shape and the distribution of the soft iron particles in the plastic.

In the case of the seal of a gable packaging, a different number of plies of the laminate are located in the seal gap at different locations. This requires measures to control the energy distribution depending on the number of plies to be sealed:

The energy distribution can be specifically controlled by a variable cross-section of each inductor over the longitudinal extension of the inductor.

Another possibility for controlling the energy distribution consists in varying the distance of the inductor from the laminate to be sealed.

Furthermore, a possibility for specifically influencing the energy distribution consists in that at least one of the partial pieces of the concentrator has sections with different permeability and/or at least one partial piece of the concentrator has a different permeability from the other partial pieces. Partial pieces or sections having higher permeability are located in particular in regions of the inductor in which a larger number of plies of the laminate must be sealed.

On the side of the sealing gap, the inductors are preferably protected against mechanical damage by a cover. A cover made of an abrasion-proof material but which is transparent for induction comes into consideration, for example, polyether ether ketone (PEEK), a high-temperature-resistant thermoplastic material which belongs to the group of high-performance plastics and which is characterized by good mechanical and electrical properties as well as high temperature resistance and exceptionally good chemical resistance. In addition, ceramic or ceramic-like materials can be used for the cover. The cover is preferably adhesively bonded tightly to the sealing jaw in order to ensure effective protection against environmental influences such as moisture, chemicals.

The plate-shaped cover can have a different thickness in some regions. The plate-shaped cover has a smaller thickness in regions in which a larger number of plies of the laminate is sealed, and a greater thickness in regions in which a smaller number of plies of the laminate is sealed.

The effect of a cover configured in such a manner is that the metal layer in the laminate responsible for the heating has a shorter distance from the strands of the inductor located therebehind in the thinner regions of the cover. The energy distribution can thus be specifically controlled by influencing the thickness of the cover.

Located between the concentrator and the block is an insulator which electrically insulates all the partial pieces of the concentrator from the metal block and at the same time is a good heat conductor. The insulator has a high thermal conductivity of preferably 100 W/mK and a high specific electrical resistance of at least $10^{12}$ $\Omega mm^2/m$. In particular, the ceramic material aluminium nitride (AlN) comes into consideration as insulator, which has a thermal conductivity of 200 W/mK.

Furthermore, insulators based on silicon carbide (SiC) or made of a thermally conductive plastic come into consideration. The thermal conductivity of thermally conductive plastic is achieved through the introduction of metal powders or fibres into a polymer matrix. The in particular plate-shaped insulator is disposed in such a manner between the concentrator and the block that the concentrator does not touch the block at any point.

In one embodiment of the invention, the inductor comprises a hollow conductor which is suitable for having a cooling medium passing through. The hollow conductor is in particular part of a cooling system. Preferably water comes into consideration as cooling medium. The connections for the supply and removal of the cooling medium are located at the ends of the inductor at which the inductor is also connected to the high-frequency voltage supply.

If the device for inductive sealing is used in an aseptic filling machine, cooling water leaking at the connections of the inductor can enter into the aseptic working area of the filling machine. Such an egress of water is undesirable can result in interruptions in operation. In one embodiment of the invention the inductor is exclusively cooled indirectly. At least one cooling channel is preferably disposed in each sealing jaw in such a manner that the cooling medium flows through the block parallel to the strands.

In one embodiment of the invention, the device for inductive sealing is configured in such a manner that both the inductive sealing and also the cooling and after-pressing can be carried out using a first and a second sealing jaw. For this purpose each sealing jaw has a first section and a second section offset in the longitudinal direction of the sealing jaw, where the inductor is disposed exclusively in the first section of each sealing jaw and an after-pressing and cooling region is located between the opposite second sections of the first and second sealing jaws. In the sealing gap between the two sealing jaws, the sealing region and the pressing and after-cooling region lie adjacent to one another.

Insofar as the inductors in this embodiment of the invention are indirectly cooled, the cooling channel extends through the first and second section of each sealing jaw in such a manner that cooling medium can flow through both the first and the second section. An essential advantage consists in that only one cooling circuit is required for cooling both the sealing and also the after-pressing and cooling region. This results in the further advantage that the connections of the cooling channel can be located exclusively in the second section of the sealing jaws. However, the second section of the sealing jaws of the device can be disposed outside the aseptic working area of the filling machine. Consequently contaminations of the aseptic working area of the filling machine by leaking cooling water at the connections of the inductor can be avoided.

BRIEF DESCRIPTION OF THE DRAWINGS

The invention is explained in detail hereinafter with reference to the figures. In the figures FIG. 6 is a front view of the sealing jaw according to FIG. 5, FIG. 6A is a section along the line A-A in FIG. 6, and FIG. 6B is a section along the line B-B FIG. 6.

DETAILED DESCRIPTION OF THE PREFERRED EMBODIMENTS

Figure 1:
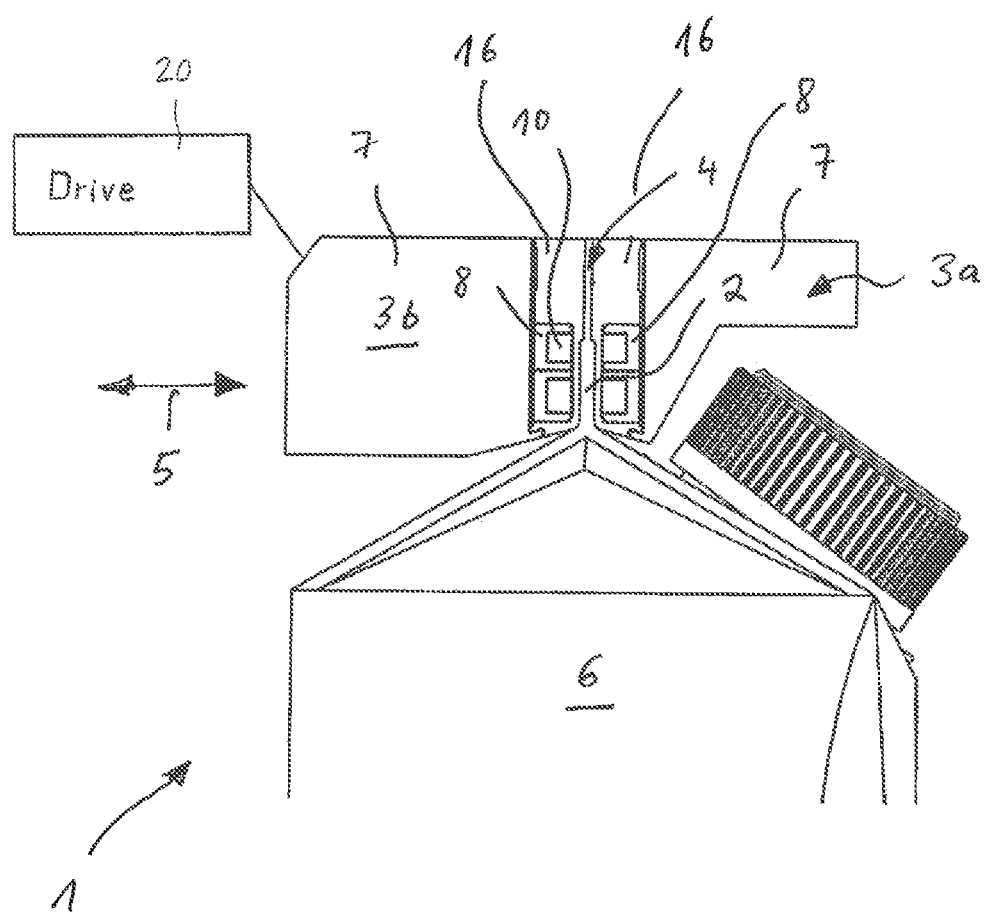
FIG. 1 is a schematic side view of a device according to an embodiment of the invention for inductive sealing of a plurality of plies of a laminate of a gable package, FIG. 2a, b are detailed views of a multi-part concentrator of a device according to FIG. 1.

FIG. 1 shows a device (1) for inductive sealing of a plurality of plies of a laminate (2) of a gable package (6) comprising a first sealing jaw (3a) and a second sealing jaw (3b), a sealing gap (4) disposed between the first and second sealing jaw (3a, 3b) for receiving the plurality of plies of the laminate (2) as well as a drive (20) for producing: a relative movement of the sealing jaws (3a, 3b) with respect to one another and for building up a pressing force on the piles of the laminate (2) in the sealing gap (4).

In the exemplary embodiment shown, the sealing jaw (3a) is held in a fixed position whereas the sealing jaw (3b) is movable to and fro in the direction of the sealing jaw (3a) with the aid of the drive. The direction of movement (5) of the sealing jaw (3a) is at right angles to the pressing surfaces of the two sealing jaws (3a, 3b). For example, a piston-cylinder unit can be considered as drive. Both sealing jaws (3a, 3b) comprise a block (7) of metal material which in the exemplary embodiment shown has a square cross-section. Naturally the block can have a different cross-section if the geometrical relationships and the installation situation of the device require this. A concentrator (8) is fastened to the block (7) in which a groove (9) having a groove opening (9a) pointing in the direction of the sealing gap (4) is introduced.

An inductor (10) configured as an induction loop is let into the groove (9), where the inductor (10) has an upper strand (10a) with connections (10b) for connection of the inductor to a high-frequency alternating voltage. The lower strand (10c) is connected via lateral bends (10d) to the upper strand (10a). In the embodiment according to FIGS. 3, 4, 4A, and 4B the inductor (10) is designed as a solid conductor and is indirectly cooled. In the embodiment according to FIGS. 5, 6, the inductor (10) is designed as a hollow conductor through which a cooling medium can flow, which is supplied to the hollow conductor at the connections (10b) for the electrical high-frequency voltage or removed from the hollow conductor.

Figure 2A:
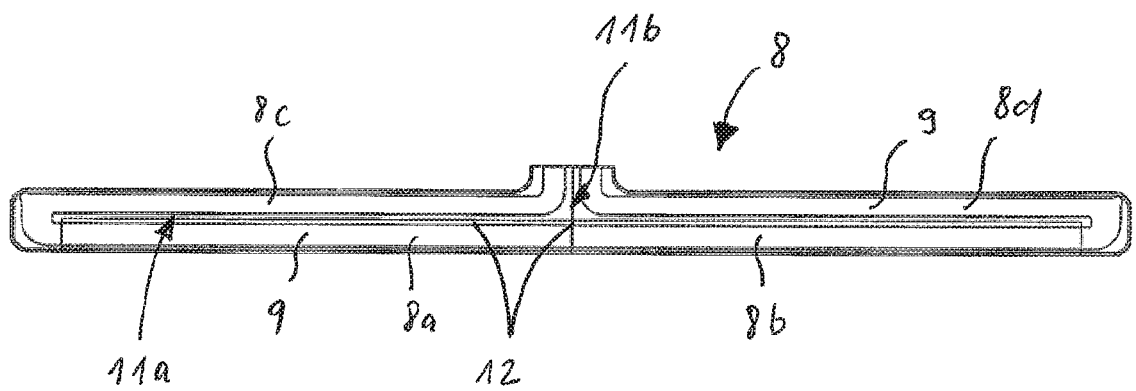
Figure 2B:
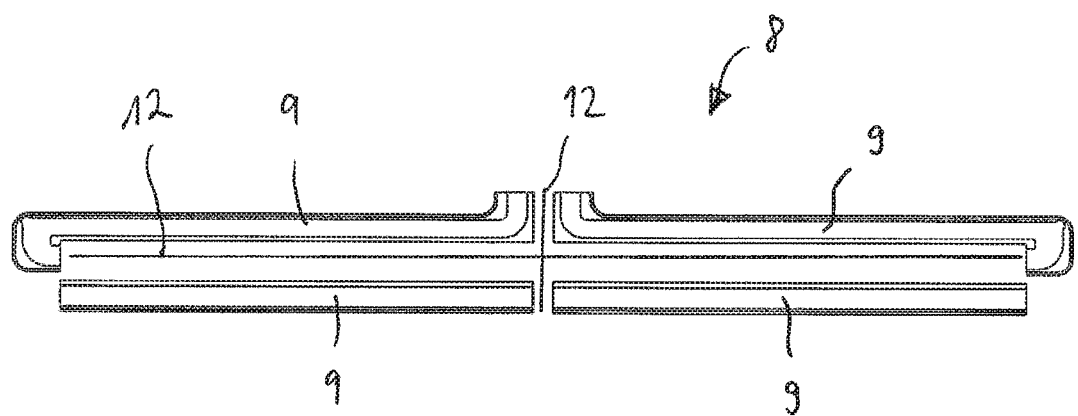
Figure 3:
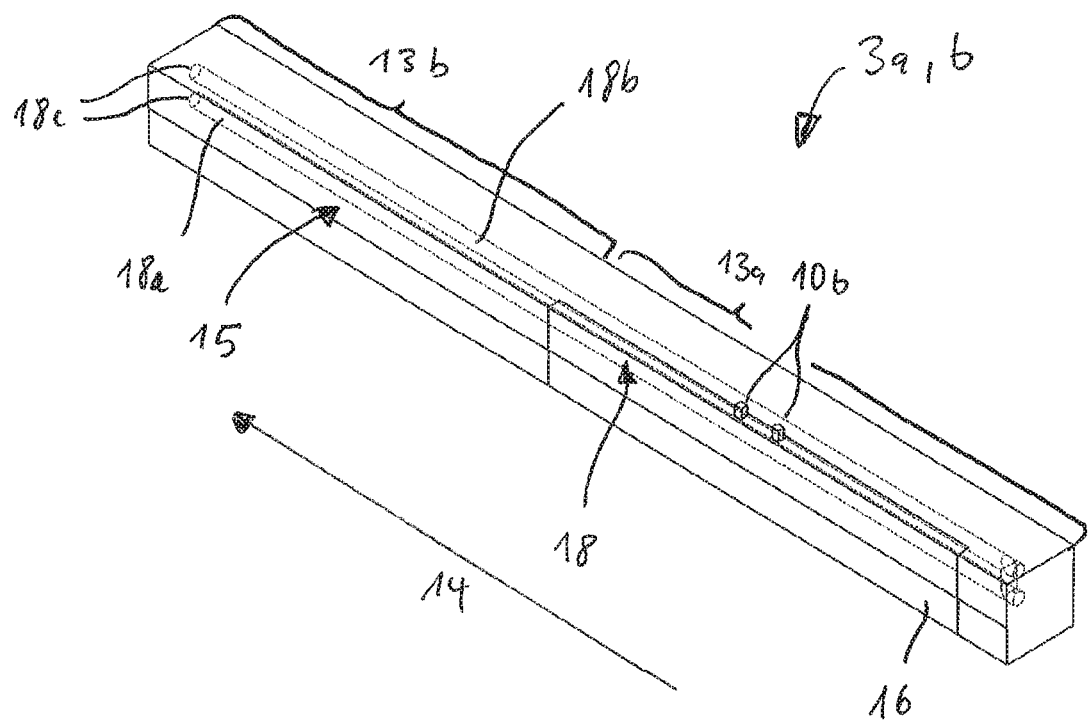
FIG. 3 is a schematic perspective view of a sealing jaw of the device according to FIG. 1.
Figure 4:
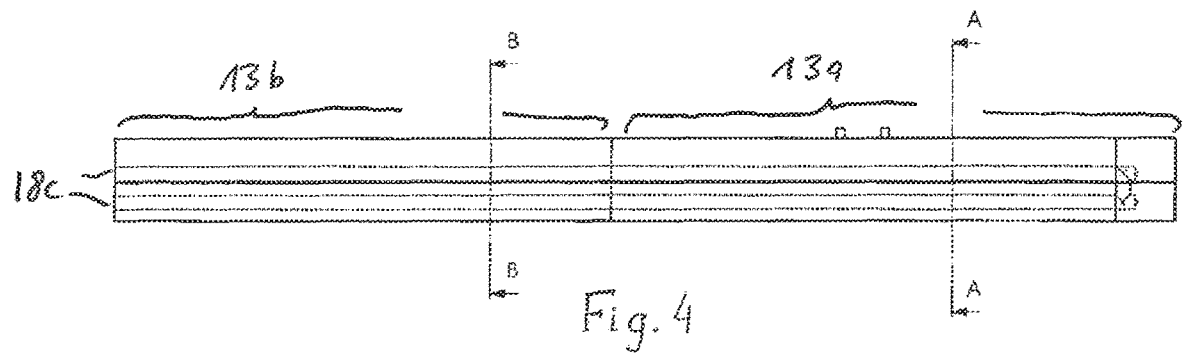
FIG. 4 is a front view of the sealing jaw according to FIG. 3.
Figure 4B:
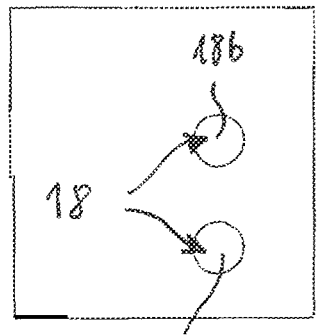
FIG. 4B is a section along the line B-B in a second section of the sealing jaw in FIG. 4.
Figure 4A:
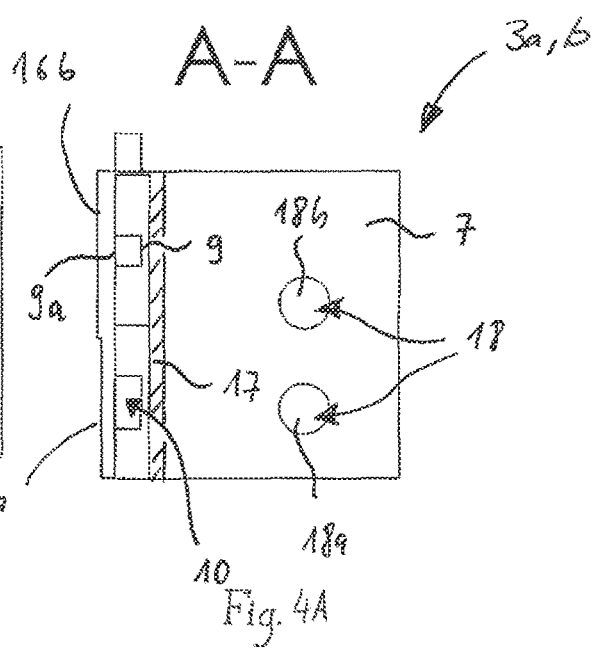
FIG. 4A is a section along the line A-A in a first section of the sealing jaw in FIG. 4.

FIGS. 2a, b illustrate the structure of the concentrator (8). In the exemplary embodiment shown, the concentrator consists of a total of four partial pieces (8a, b, c, d). FIG. 2b shows the separated partial pieces (8a, b, c, d) whereas FIG. 2a shows the partial pieces (8a, b, c, d) combined to form the concentrator (8).

The upper strand (10a) as well as the bends (10b) of the inductor (10) are let into the groove (9) in the partial pieces (8c, d) and the lower strand (10c) of the inductor (10) is let into the groove (9) in the partial pieces (8a, b) of the concentrator (8). All the partial pieces (8a, b, c, d) are electrically insulated from one another in order to avoid electrical flash-overs between the upper and the lower strand (10a, c) which can adversely affect the structure of the magnetic field over the entire length of the inductor (10) and therefore jeopardize the sealing result. The partial pieces (8a, b, c, d) are electrically insulated from one another by a horizontal gap (11a) and a vertical gap (11b). In order to improve the insulation between the partial pieces (8a-d), a polyimide film (12) is introduced in the horizontal and vertical gap (11a, 11b). The polyimide film (12) can be loaded in permanent use for temperatures up to 230° C. and briefly up to 400° c.

As can be seen in particular from FIGS. 3 to 6B, each sealing jaw (3a, 3h) has a first section (13a) and a second section (13b) offset in the longitudinal direction (14) of the sealing jaw (3a, 3b). The inductor (10) is located exclusively in the first section (13a). Located between the opposite second sections (13b) of the first and second sealing jaw (3a, 3b) is an after-pressing and cooling region (15) for the plies of the laminate (2) sealed in the first section (13a). On the side of each sealing jaw (3a, 3b) facing the sealing gap (4), a cover (16) is disposed in the region of the first section (13a) which protects the inductor (9) exposed towards the sealing gap (14) in the groove (9) from mechanical damage. The plate-shaped cover (16) is designed as stepped in cross-section. In the region of the lower strand (10c) of the inductor (10), the plate-shaped cover (16) is thinner than in the section (16b) covering the upper strand (10a). The gradation of the cover (16) is adapted to the different number of plies of the laminate (2) to be sealed in the sealing gap (4). Four or five plies of the laminate (2) are located in the lower section (16a) of the sealing gap (4) whereas only two plies of the laminate (2) to be sealed are located in the upper section (16b). In the lower section (16a) of the cover the metal layer of the laminate (2) responsible for the heating lies closer to the lower strand (10c) so that as a result of the shorter distance the inductor (10) inputs a higher energy into the four plies than into the two plies in the region of the upper section (16b).

In order to avoid electrical flashover between the strands (10a, 10c) of the inductor (10) through the block (7) and an adverse effect on the energy irradiation, a plate-shaped insulator (17) made of a ceramic material is disposed behind the concentrator (8). The ceramic material comprises in particular aluminium nitride, having a high thermal conductivity with at the same time high specific electrical resistance. The high thermal conductivity is in particular of decisive importance in an embodiment of the device with indirect cooling of the inductor (10) according to FIGS. 3, 4, 4A, and 4B.

For indirect cooling, a cooling channel (18) with an intake (18a) and a return (18b) is located in the block (7) of each sealing jaw (3a, 3b). The intake and return extends from the connections (18c) in the longitudinal direction (14) of the sealing jaw (3a, 3b). The connections (18c) are located on the front side of the sealing jaw (3a, b) in the second section (13b).

Figure 5:
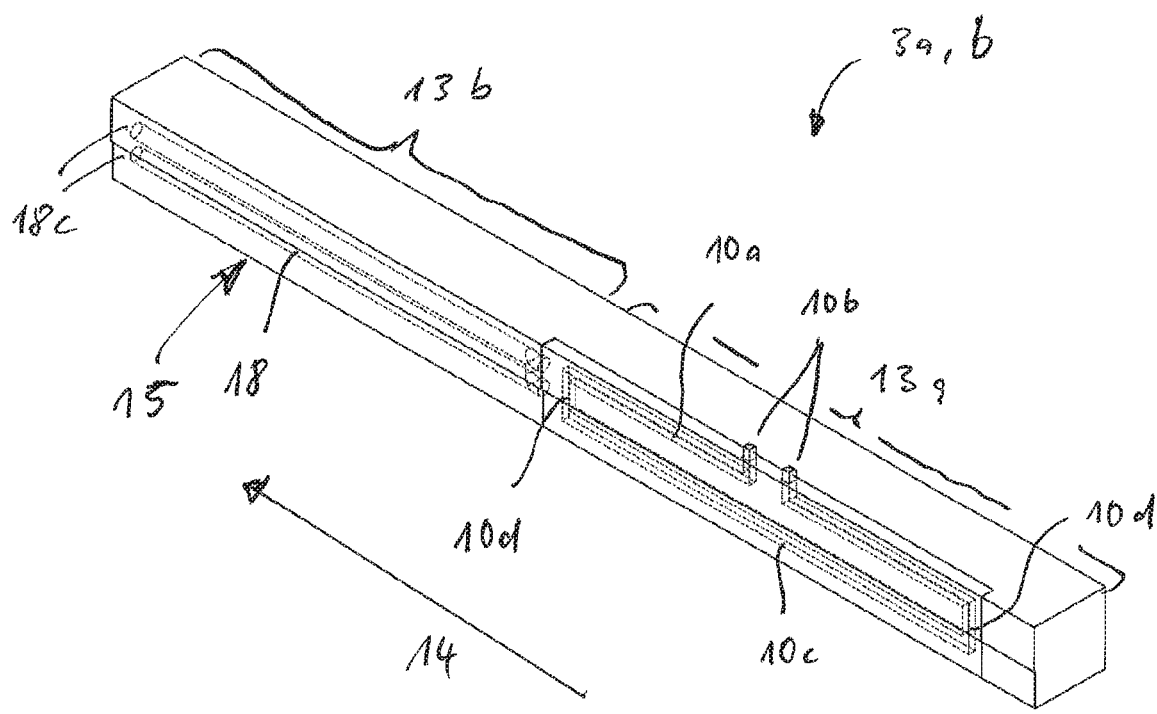
FIG. 5 is a schematic perspective view of another embodiment of a sealing jaw.

In the exemplary embodiment according to FIGS. 5, 6A, and 5B with an internally cooled inductor (10), the cooling channel (18) is located exclusively in the second section (13b). The connections (18c) for the cooling medium are also located on the front side of the sealing jaw (3a, 3b) in the second section (13b). In principle however, it is also possible in one embodiment of the device with internally cooled inductor (10) to provide additional cooling channels in the first section (13a) in order to improve the cooling capacity.

The previously described device (1) for the inductive sealing of a plurality of plies of a laminate (2) of a gable package (6) operates as follows:

The plies of the laminate (2) of the gable package (6) to be sealed are conveyed by means of conveyor, not shown, which operates in a clocked manner, into the opened sealing gap (4) between the first sections (13a) of the two sealing jaws (3a, b). Then with the aid of the drive not shown, sealing jaws (3a, b) are moved towards one another and the adjacent thermoplastic layers of the plurality of plies of the laminate (2) are compressed and sealed with one another by induction of an eddy current in the metal layer of the laminate (2).

The sealing gap (4) is then opened again and the sealed gable package (6) is conveyed in the longitudinal direction (14) between the second sections (13b) of the sealing jaws (3a, b). As soon as the sealed plies of the laminate (2) are located in the after-pressing and cooling region (15), a pressing force on the already sealed plies of the laminate in the sealing gap (4) is built up by movement of the sealing jaw (3a). At the same time, the sealed plies of the laminate (2) are cooled. The sealing gap (4) is then opened and the gable package (6) is conveyed in the longitudinal direction (14) out from the sealing gap. During the after-pressing and cooling in the second section (13b), the next gable package (6) conveyed by the conveyor into the opened sealing gap (4) is already sealed in the first section (13a).

In a filling plant for liquid foodstuffs with an aseptic working area, the sealing jaws (3a, 3b) are disposed parallel to the conveying direction of the gable packages (6) through the aseptic working area. In this case, the first section (13a) is located in the aseptic working area whereas the second section (13b) is located outside the working area. The connections (18c) for the cooling medium on the front side of the second section (13b) prevent any leaking cooling medium from being able to enter into the aseptic working area.

In a further embodiment of the invention, the length of the sealing jaw (3a, b) and of the lower and upper strand (10a, 10c) of the inductor (10) is dimensioned in such a manner that on both sides of the connections (10b) the sealing region of a gable package (6) can be sealed simultaneously in each case.

The length of the after-pressing and cooling region (15) in the second section is also dimensioned in such a manner that the sealing regions of two gable packages (6) can be simultaneously after-pressed and cooled.

LIST OF REFERENCES

List of References

| No. | Designation |
| --- | --- |
| 1. | Device |
| 2. | Laminate |
| 3a. | Sealing jaw |
| 3b. | Sealing jaw |
| 4. | Sealing gap |
| 5. | Movement direction |
| 6. | Gable package |
| 7. | Metal block |

-continued

| No. | Designation |
| --- | --- |
| 8. | Concentrator |
| 8a. | Partial piece |
| 8b. | Partial piece |
| 8c. | Partial piece |
| 8d. | Partial piece |
| 9. | Groove |
| 9a. | Groove opening |
| 10. | Inductor |
| 10a. | Upper strand |
| 10b. | Connections |
| 10c. | Lower strand |
| 10d. | Bend |
| 11a. | Horizontal gap |
| 11b. | Vertical gap |
| 12 | Polyimide film |
| 13a. | First section |
| 13b. | Second section |
| 14. | Longitudinal direction |
| 15. | After-pressing and cooling region |
| 16. | Cover |
| 16a. | Lower section |
| 16b. | Upper section |
| 17. | Insulator |
| 18. | Cooling channel |
| 18a. | Intake |
| 18b. | Return |
| 18c. | Connections |
| 20. | Drive |

The invention claimed is:

1. A device for inductive sealing of a plurality of plies of a laminate, the laminate including a carrier layer made of electrically non-conductive material, a sealing layer made of thermoplastic material, and a metal layer disposed between the sealing layer and the carrier layer, the device comprising:
a first sealing jaw and a second sealing jaw, wherein the first sealing jaw and the second sealing jaw are movable relative to one another,
the first sealing jaw and the second sealing jaw defining a sealing gap therebetween configured to receive a plurality of plies of the laminate,
a drive configured to impart relative movement of the first sealing jaw and the second sealing jaw to open and close the sealing gap and to build up a pressing force on the plurality of plies of the laminate in the sealing gap,
each of the first sealing jaw and the second sealing jaw comprises a block consisting of a metallic material and a concentrator fastened to the block, wherein the concentrator includes a groove having a groove opening facing the sealing gap, the concentrator includes a plurality of partial pieces, each of the partial pieces consists of a material capable of magnetic field concentration, and each of the partial pieces are electrically insulated with respect to one another and with respect to the block, and
an inductor received in the groove and configured to heat the metal layer in the laminate to weld together adjacent thermoplastic layers of the plurality of plies of the laminate when the pressing force is applied to the plurality of plies by the first sealing jaw and the second sealing jaw, wherein the inductor has an upper strand and a lower strand, the upper strand and the lower strand are connected to one another by lateral bends of the inductor, at least a first partial piece of the partial pieces of the concentrator receives exclusively the upper strand in the groove, and at least a second partial piece of the partial pieces of the concentrator receives exclusively the lower strand in the groove.

2. The device of claim 1, wherein the partial pieces of the concentrator are electrically insulated from each other by at least one gap.

3. The device of claim 2, further comprising an insulating material of polyimide disposed in each the at least one gap.

4. The device of claim 1, wherein at least two of the partial pieces of the concentrator have a different permeability.

5. The device of claim 1, wherein at least one of the partial pieces of the concentrator has sections with different permeability.

6. The device of claim 1, further comprising a cover disposed on a side of each of the first sealing jaw and the second sealing jaw facing the sealing gap.

7. The device of claim 1, further comprising an insulator insulating all the partial pieces of the concentrator with respect to the metal block, which has a high thermal conductivity of at least 20 W/mK and a high specific electrical resistance of at least 1012 Ωmm2/m.

8. The device of claim 7, wherein the insulator has a high thermal conductivity of at least 100 W/mK.

9. The device of claim 7, wherein the insulator consists of a ceramic material aluminium nitride (AlN).

10. The device of claim 1, wherein the inductor comprises a hollow conductor configured to pass therethrough a cooling medium.

11. The device of claim 1, wherein at least one cooling channel is disposed in the block of the each of the first sealing jaw and the second sealing jaw.

12. The device of claim 1, wherein the each of the first sealing jaw and the second sealing jaw has a first section and a second section offset in a longitudinal direction of the each of the first sealing jaw and the second sealing jaw, the inductor is disposed exclusively in the first section of the each of the first sealing jaw and the second sealing jaw, and an after-pressing and cooling region is located between the opposite second sections of the first sealing jaw and the second sealing jaw.

13. The device of claim 12, further comprising at least one cooling channel disposed in the block of the each of the first sealing jaw and the second sealing jaw, wherein the at least one cooling channel extends through the first section and the second section of the each of the first sealing jaw and the second sealing jaw, whereby cooling medium can flow through both the first section and the second section.

14. The device of claim 13, wherein connections of the cooling channel for the cooling medium are disposed on the second section.

15. A method for inductive sealing of a plurality of plies of a laminate of a packaging using a device including a first sealing jaw and a second sealing jaw, wherein the first sealing jaw and the second sealing jaw are movable relative to one another and the first sealing jaw and the second sealing jaw define a sealing gap therebetween configured to receive a plurality of plies of the laminate, a drive configured to impart relative movement of the first sealing jaw and the second sealing jaw to open and close the sealing gap and to build up a pressing force on the plurality of plies of the laminate in the sealing gap, each of the first sealing jaw and the second sealing jaw includes a block consisting of a metallic material and a concentrator fastened to the block, wherein the concentrator includes a groove having a groove opening facing the sealing gap, the concentrator includes a plurality of partial pieces, each of the partial pieces consists of a material capable of magnetic field concentration, and each of the partial pieces are electrically insulated with respect to one another and with respect to the block, and an inductor received in the groove and configured to heat the metal layer in the laminate to weld together adjacent thermoplastic layers of the plurality of plies of the laminate when the pressing force is applied to the plurality of plies by the first sealing jaw and the second sealing jaw, wherein the each of the first sealing jaw and the second sealing jaw has a first section and a second section offset in a longitudinal direction of the each of the first sealing jaw and the second sealing jaw, the inductor is disposed exclusively in the first section of the each of the first sealing jaw and the second sealing jaw, and an after-pressing and cooling region is located between the opposite second sections of the first sealing jaw and the second sealing jaw, the method comprising the steps:

conveying the plies of the laminate to be sealed into the opened sealing gap between the first sections of the first sealing jaw and the second sealing jaw when the sealing gap is opened, sealing the plies of the laminate in the sealing gap between the first sections of the first sealing jaw and the second sealing jaw, opening the sealing gap, conveying, after the step of opening, the sealed plies of the laminate in the opened sealing gap from the first sections to the second sections of the first sealing jaw and the second sealing jaw, the first sections and the second sections being offset in the longitudinal direction of the sealing jaws, building up a pressing force onto the sealed plies of the laminate in the after-pressing and cooling region of the sealing gap between the second sections and cooling the laminate, and opening the sealing gap and conveying the cooled plies of the laminate out of the sealing gap.

16. The method according to claim 15, wherein the step of sealing is performed in an aseptic working area of a filling machine for liquid foodstuffs and the step of building up the pressing force and cooling of the laminate is performed in the after-pressing and cooling region outside of the aseptic working area.

* * * * *